United States Patent
Igarashi

(10) Patent No.: US 12,511,939 B2
(45) Date of Patent: Dec. 30, 2025

(54) PHOTOGRAPH ACQUISITION AND OBJECT IDENTIFICATION METHOD AND APPARATUS

(71) Applicant: TOYOTA JIDOSHA KABUSHIKI KAISHA, Aichi-ken (JP)

(72) Inventor: Ryo Igarashi, Chofu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 23 days.

(21) Appl. No.: 18/741,693

(22) Filed: Jun. 12, 2024

(65) Prior Publication Data

US 2025/0384716 A1    Dec. 18, 2025

(51) Int. Cl.
*G06V 40/20* (2022.01)
*B60K 35/22* (2024.01)
*G06T 7/55* (2017.01)

(52) U.S. Cl.
CPC .............. *G06V 40/28* (2022.01); *B60K 35/22* (2024.01); *G06T 7/55* (2017.01)

(58) Field of Classification Search
CPC ........... G06V 40/28; G06T 7/55; B60K 35/22
See application file for complete search history.

(56) References Cited

U.S. PATENT DOCUMENTS

| | | | |
|---|---|---|---|
| 11,977,243 B1* | 5/2024 | Szczerba | G01C 21/3641 |
| 2017/0330034 A1* | 11/2017 | Wang | H04L 67/306 |
| 2017/0364761 A1* | 12/2017 | Ryu | B60K 35/28 |
| 2020/0318989 A1 | 10/2020 | Yang | |
| 2021/0291653 A1* | 9/2021 | Higashiyama | B60K 35/28 |
| 2021/0309233 A1 | 10/2021 | Goto | |
| 2022/0203996 A1* | 6/2022 | Katz | B60W 50/14 |
| 2023/0095218 A1* | 3/2023 | Livne | G06N 3/0464 |
| | | | 382/118 |
| 2023/0258466 A1* | 8/2023 | Lee | B60K 35/28 |
| | | | 701/426 |
| 2023/0269463 A1 | 8/2023 | Salter et al. | |

FOREIGN PATENT DOCUMENTS

JP          2023085925 A   *   6/2023

* cited by examiner

*Primary Examiner* — Chico A Foxx
(74) *Attorney, Agent, or Firm* — HAUPTMAN HAM, LLP

(57) ABSTRACT

A method includes, detecting a pointing motion made by an occupant of a vehicle and causing a photograph to be taken by a camera associated with the vehicle. The method also includes processing one or more of the photograph, a time the photograph was taken, location information of the vehicle at the time the photograph was taken, a photographing direction extending from the camera at the time the photograph was taken, or map data to obtain a candidate object of interest in the photograph and description information associated with the candidate object of interest. The method further includes causing a graphical user interface to be output by a display. The graphical user interface includes a geographical map, a location icon indicating a location on the geographical map at which the photograph was taken, a graphical object representing the photographing direction, and description information associated with the candidate object of interest.

20 Claims, 6 Drawing Sheets

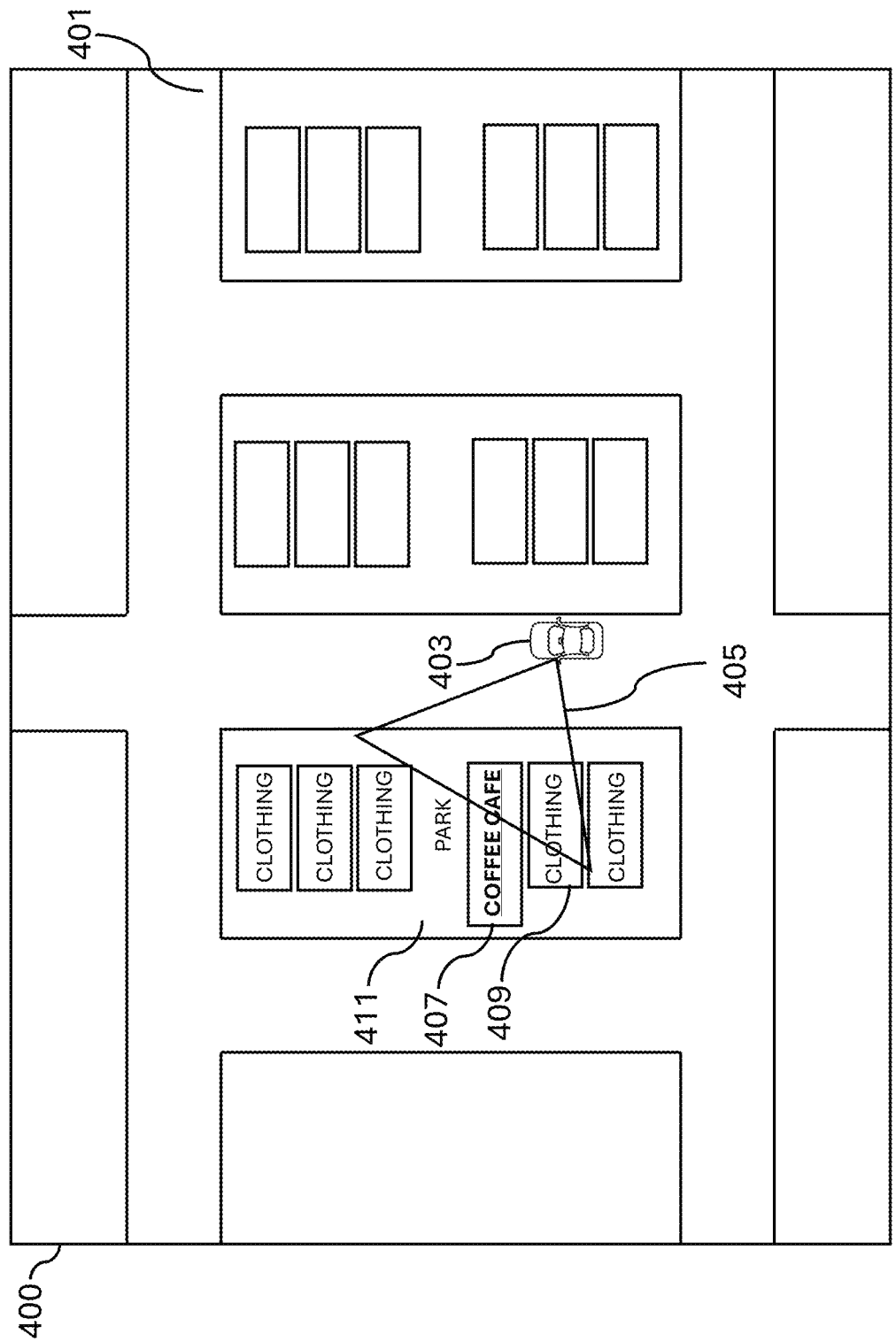

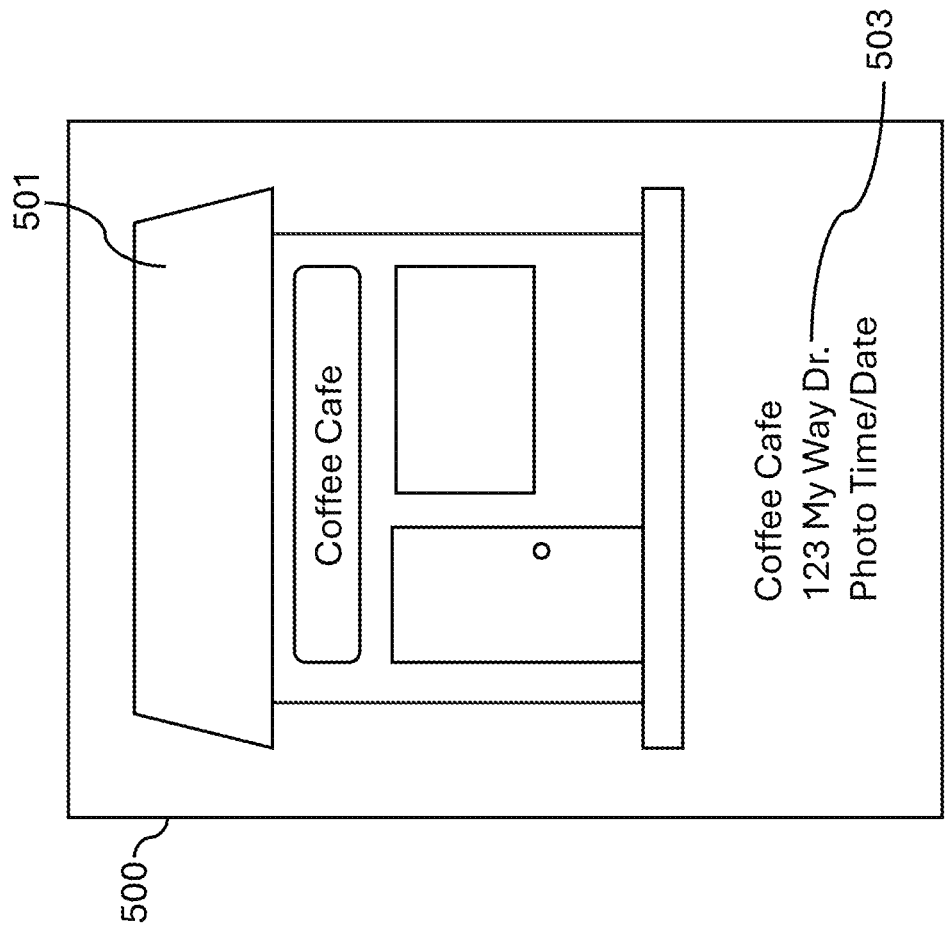

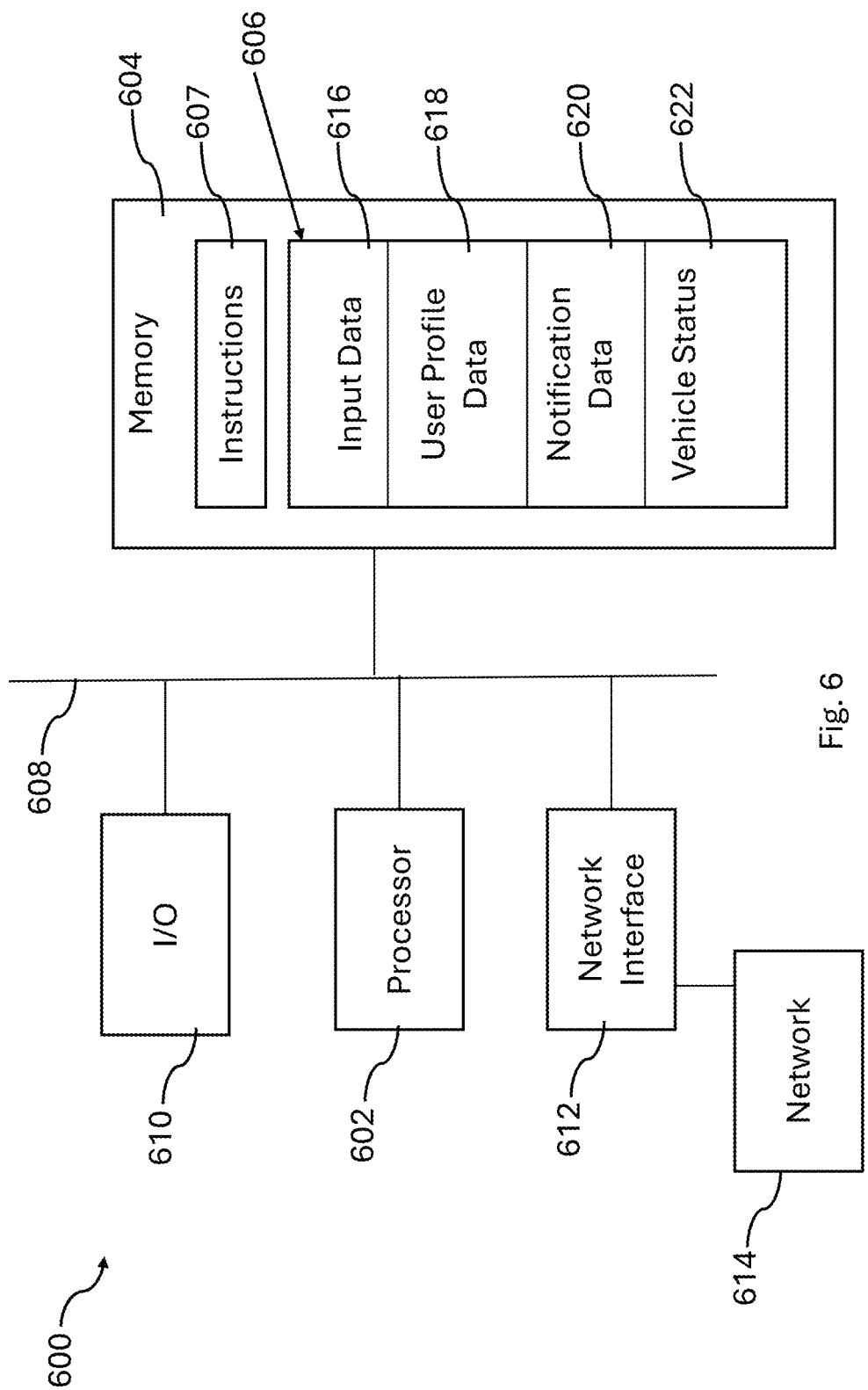

PHOTOGRAPH ACQUISITION AND OBJECT IDENTIFICATION METHOD AND APPARATUS

BACKGROUND

Device manufacturers and vehicle manufacturers are continually challenged to provide products and services that offer value and convenience to users such as vehicle occupants. Vehicle occupants often take pictures from a vehicle, view the pictures by way of a display, and recall from personal memory what was in the picture or why the picture was taken.

SUMMARY

An aspect of this description relates to a method. The method comprises, in response to detecting a pointing motion made by an occupant of a vehicle, causing a photograph to be taken by a camera associated with the vehicle. The method also comprises processing one or more of the photograph, a time the photograph was taken, location information of the vehicle at the time the photograph was taken, a photographing direction extending from the camera at the time the photograph was taken, or map data to obtain a candidate object of interest in the photograph and description information associated with the candidate object of interest. The method further comprises causing a graphical user interface to be output by a display. The graphical user interface comprises a geographical map, a location icon indicating a location on the geographical map at which the photograph was taken, a graphical object representing the photographing direction, and description information associated with the candidate object of interest. The graphical object extends from the location icon in the graphical user interface.

An aspect of this description relates to an apparatus. The apparatus includes a processor and a memory having instructions stored thereon that, when executed by the processor, cause the apparatus to, in response to detecting a pointing motion made by an occupant of a vehicle, cause a photograph to be taken by a camera associated with the vehicle. The apparatus is also caused to process one or more of the photograph, a time the photograph was taken, location information of the vehicle at the time the photograph was taken, a photographing direction extending from the camera at the time the photograph was taken, or map data to obtain a candidate object of interest in the photograph and description information associated with the candidate object of interest. The apparatus is further caused to cause a graphical user interface to be output by a display. The graphical user interface comprises a geographical map; a location icon indicating a location on the geographical map at which the photograph was taken; a graphical object representing the photographing direction, and description information associated with the candidate object of interest. The graphical object extends from the location icon in the graphical user interface.

An aspect of this description relates to a non-transitory computer readable medium having instructions stored thereon that, when executed by the processor, cause an apparatus to, in response to detecting a pointing motion made by an occupant of a vehicle, cause a photograph to be taken by a camera associated with the vehicle. The apparatus is also caused to process one or more of the photograph, a time the photograph was taken, location information of the vehicle at the time the photograph was taken, a photographing direction extending from the camera at the time the photograph was taken, or map data to obtain a candidate object of interest in the photograph and description information associated with the candidate object of interest. The apparatus is further caused to cause a graphical user interface to be output by a display. The graphical user interface comprises a geographical map; a location icon indicating a location on the geographical map at which the photograph was taken; a graphical object representing the photographing direction, and description information associated with the candidate object of interest. The graphical object extends from the location icon in the graphical user interface.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 is a graphical user interface, in accordance with one or more embodiments.

FIG. 5 is a graphical user interface, in accordance with one or more embodiments.

FIG. 6 is a block diagram of a system for acquiring photographs from a vehicle and identifying objects of interest in the photographs, in accordance with one or more embodiments.

DETAILED DESCRIPTION

Figure 1:
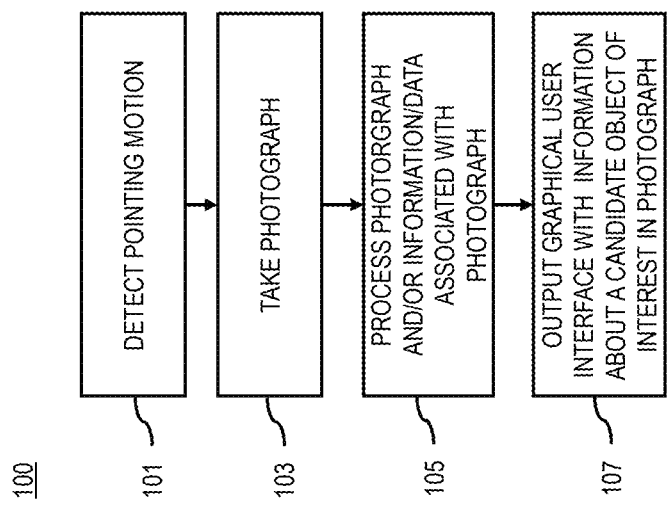
FIG. 1 is a flowchart of a method of for acquiring photographs from a vehicle and identifying objects of interest in the photographs, in accordance with one or more embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some vehicles are equipped with infotainment systems that have one or more displays, navigation capabilities, and receive a user input from a vehicle occupant by way of touch screen(s), microphone(s), button(s), knob(s), joystick(s), trackpad(s), motion sensor(s), cameras(s) or other suitable controller(s). Some infotainment systems are capable of searching for addresses based on a user input associated with a place of interest. Some vehicles are equipped with external cameras that are communicatively coupled with the infotainment system for taking photographs of scenes external to the vehicle in response to a user input.

Sometimes, a vehicle occupant takes many photographs from the vehicle. For example, while on a drive, the vehicle occupant might be interested in an object such as a building, a business, a statue, scenery, another vehicle, a motorcycle, a bicycle, a person or group of people, an event, or anything that might otherwise be of interest to the vehicle occupant at the time of taking the photograph. However, when the vehicle occupant reviews the photographs later, the vehicle occupant may not recall what an object of interest was in one or more of the photographs, why one or more of the photographs were taken, or why the object(s) in the photos were ever of interest. Additionally, the vehicle occupant may not recall information about where one or more of the photographs were taken.

The current description includes a method and a system for acquiring photographs from a vehicle and identifying objects of interest in the photographs to assist a user in gaining knowledge about a photograph and one or more objects of interest included in the photograph.

FIG. 1 is a flowchart of a method 100 of acquiring photographs from a vehicle and identifying objects of interest in the photographs, in accordance with one or more embodiments.

Figure 2:
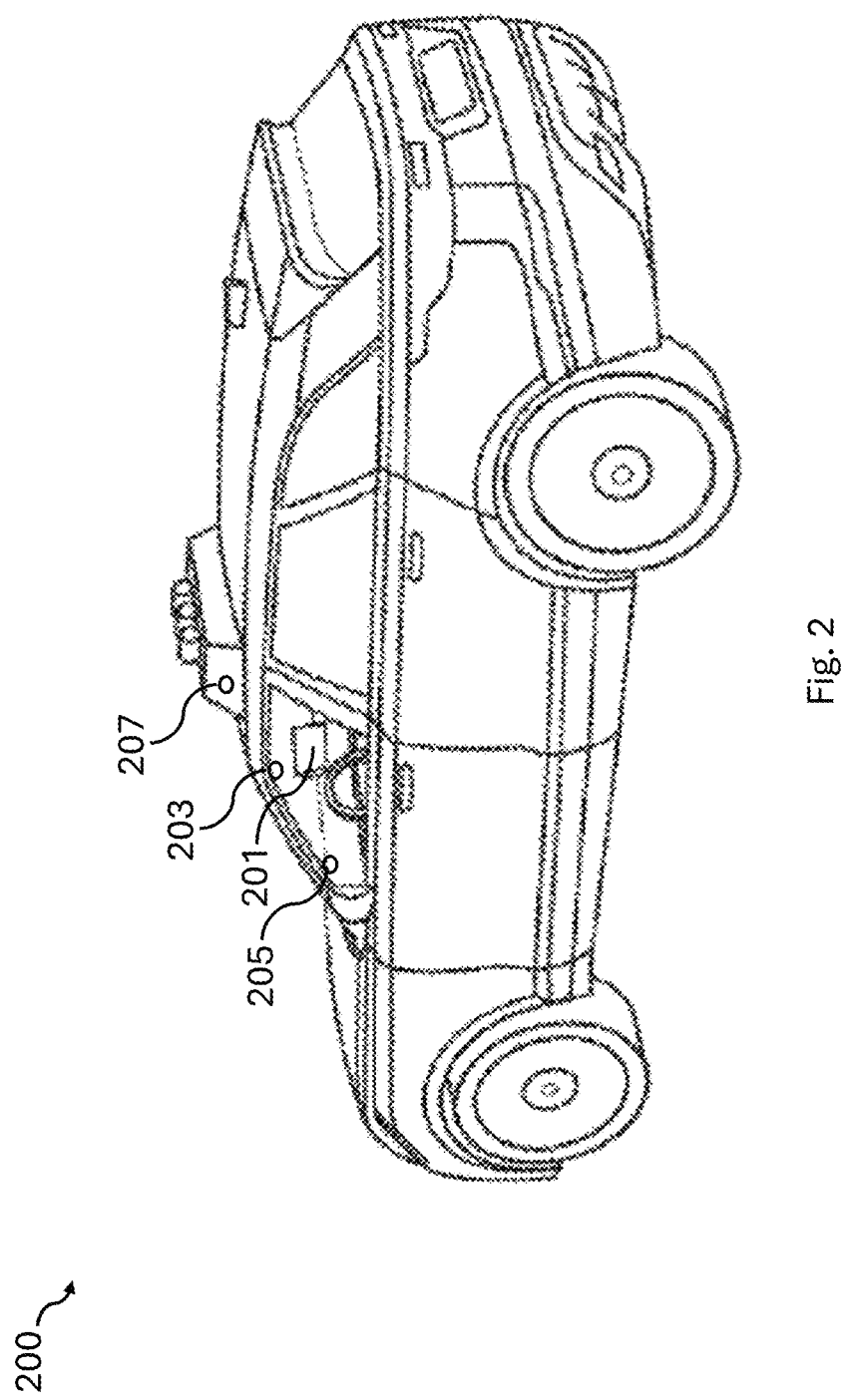
FIG. 2 is a perspective view of a vehicle, in accordance with one or more embodiments.

In some embodiments, the method 100 is implemented using a system 600 (FIG. 6). In some embodiments, the method 100 is implemented using a system other than the system 600 (FIG. 6). In some embodiments, the method 100 is implemented in a vehicle 200 (FIG. 2). In some embodiments, the method 100 is implemented in a vehicle other than the vehicle 200 (FIG. 2).

In some embodiments, the method 100 involves detecting a pointing direction and/or gaze direction of an occupant of a vehicle, taking a photograph based on a pointing motion or other suitable user input by the occupant of the vehicle, and processing information comprising one or more of location information, line of sight, range of view, direction of movement, vehicle speed, objects in the photograph, historic image data associated with one or more of the location information, the line of sight, the range of view, the direction of movement, or the vehicle speed, or other suitable data to ascertain a likely point of interest or object of interest in the photo. In some embodiments, the information is input to a multimodal artificial intelligence (AI) to ascertain the likely point of interest and/or object of interest in the photo. Information corresponding to the likely point of interest and/or object of interest in the photo such as name, location, time the photograph was taken, or other suitable data is then acquired, and the information corresponding to the likely point of interest and/or object of interest is then output by way of a display of the infotainment system or a mobile device communicatively coupled with the infotainment system on a geographical map that is viewable by way of the display. In some embodiments, a mobile device is communicatively coupled with the vehicle by way of a wired connection or a wireless connection such as WiFi, Bluetooth®, or other suitable wireless mode of connectivity.

In some embodiments, the geographical map includes at least some of the information overlayed on the geographical map. In some embodiments, the direction of capturing the photograph is shown as information overlayed on the geographical map. In some embodiments, the direction of capturing the photograph is shown as a cone or triangle, or other suitable shape on the geographical map. In some embodiments, the photograph is displayed concurrently with the geographical map. In some embodiments, the geographical map includes two or more icons indicative that a photograph was taken at a location over which the icon appears on the geographical map.

In operation 101, a pointing motion is detected by an occupant of a vehicle. In some embodiments, the pointing motion is replaced with or combined with some other suitable user input by which the occupant of the vehicle interacts with a vehicle system to cause the vehicle system to perform an instructed task such as taking a photograph. In some embodiment, an additional user input to the pointing motion or alternative user input to the pointing motion is a gaze direction of the occupant of the vehicle.

In some embodiments, the occupant of the vehicle is a driver of the vehicle. In some embodiments, the occupant of the vehicle is a passenger of the vehicle. In some embodiments, the driver of the vehicle is seated behind a steering wheel of the vehicle. In some embodiments, the passenger of the vehicle is seated in a seat other than the driver's seat such as a front passenger seat or a rear passenger seat. In some embodiments, the occupant of the vehicle is any passenger of the vehicle that is seated or standing in the vehicle.

In some embodiments, the pointing motion and/or gaze direction is detected by one or more sensors or cameras of the vehicle. In some embodiments, sensors or cameras of the vehicle that detect the pointing motion and/or gaze direction of the occupant of the vehicle are internal sensors or cameras such as sensors or cameras that are facing into a vehicle cabin. In some embodiments, sensors or cameras of the vehicle that detect the pointing motion and/or gaze direction of the occupant of the vehicle are external sensors or cameras such as sensors or cameras that are facing outward from the vehicle cabin. In some embodiments, internal sensors or cameras and external sensors or cameras of the vehicle that detect the pointing motion and/or gaze direction of the occupant of the vehicle are physically inside the vehicle. In some embodiments, internal sensors or cameras of the vehicle that detect the pointing motion and/or gaze direction of the occupant of the vehicle are on an exterior of the vehicle facing into the cabin of the vehicle. In some embodiments, external sensors or cameras of the vehicle that detect the pointing motion and/or gaze direction of the occupant of the vehicle are on an interior of the vehicle facing outward from the cabin of the vehicle. In some embodiments, external sensors or cameras of the vehicle that detect the pointing motion and/or gaze direction of the occupant of the vehicle are on the exterior of the vehicle facing outward from the vehicle. In some embodiments, the pointing motion and/or gaze direction is detected by a combination of internal sensors or cameras of the vehicle that detect the pointing motion of the occupant of the vehicle and external sensors or cameras of the vehicle that detect the pointing motion of the occupant of the vehicle.

In operation 103, in response to detecting the pointing motion or other suitable input made by the occupant of a vehicle, a photograph is caused to be taken by one or more cameras for taking a photograph of a scene outside the vehicle. In some embodiments, the one or more cameras for taking the photograph of the scene outside the vehicle are physically inside the vehicle. In some embodiments, the one or more cameras for taking the photograph of the scene outside the vehicle are mounted to an exterior of the vehicle.

In operation 105, one or more of the photograph, a time the photograph was taken, location information of the vehicle at the time the photograph was taken, a photographing direction extending from the camera at the time the photograph was taken, or map data is processed to obtain a candidate object of interest in the photograph and description information associated with the candidate object of interest.

In some embodiments, a database associated with a vehicle infotainment/navigation system is queried based on data obtained from one or more of the photograph, the time the photograph was taken, the location information, the photographing direction, or the map data to obtain the candidate object of interest in the photograph and the description information associated with the candidate object of interest. In some embodiments, the database associated with the vehicle infotainment/navigation system is onboard the vehicle. In some embodiments, the database associated with the vehicle infotainment/navigation system is remote from the vehicle and accessible by way of a wired or a wireless connection.

In some embodiments, the photographing direction is based on one or more of a detected pointing direction of the pointing motion of the occupant of the vehicle, a gaze direction of the occupant of the vehicle, a speed of the vehicle, or a change in the pointing direction of the pointing motion and/or gaze direction of the occupant of the vehicle with respect to a side of the vehicle as the vehicle moves past the candidate object of interest. The detected pointing direction of the pointing motion and/or the gaze direction of the occupant of the vehicle is captured by the one or more sensors or cameras of the vehicle that detect the pointing motion of the occupant of the vehicle.

In some embodiments, context data including audio data received by a microphone associated with the vehicle within a preset time period encompassing the time the photograph was taken to obtain the candidate object of interest is processed. In some embodiments, the microphone is an in-cabin microphone configured to capture sounds within the cabin of the vehicle. In some embodiments, the microphone is an external microphone configured to capture sounds outside the vehicle. In some embodiments, the microphone is configured to capture voice commands as a user input. In some embodiments, the context data comprises one or more of a conversation between two or more vehicle occupants, a conversation between the occupant of the vehicle and a person outside the vehicle such as by way of a telephone, video call, or other suitable form of communication, a conversation between the occupant of the vehicle and a person outside the vehicle outside the vehicle such as through a window or by way of an external speaker of the vehicle, an inquiry made by a vehicle occupant verbally, music, other sounds, externally captured sounds, or other suitable internal or external audio capable of being captured by one or more microphones associated with the vehicle.

In some embodiments, the processing of the one or more of the photograph, the time the photograph was taken, the location information of the vehicle at the time the photograph was taken, the photographing direction extending from the camera at the time the photograph was taken, or the map data to obtain the candidate object of interest in the photograph and the description information associated with the candidate object of interest, comprises inputting the one or more of the photograph, the time the photograph was taken, the location information of the vehicle at the time the photograph was taken, the photographing direction extending from the camera at the time the photograph was taken, or the map data into a multimodal artificial intelligence (AI) system to generate the description information associated with the candidate object of interest and processing the description information associated with the candidate object of interest generated by the multimodal AI. In some embodiments, the multimodal AI is locally executed by one or more processors of the vehicle. In some embodiments, the multimodal AI is remote from the vehicle and executed by one or more processors with which the vehicle is communicatively coupled by a wired or a wireless connection.

In operation 107, a graphical user interface is caused to be output by a display of the vehicle or a mobile device communicatively coupled with the vehicle. In some embodiments, the display is associated with the infotainment system/navigation system of the vehicle. The graphical user interface comprises a geographical map, a location icon indicating a location on the geographical map at which the photograph was taken, a graphical object representing the photographing direction, and description information associated with the candidate object of interest. The graphical object extends from the location icon in the graphical user interface.

In some embodiments, the graphical object representing the photographing direction is a polygon. In some embodiments, the graphical object representing the photographing direction is a triangle. In some embodiments, the graphical user interface comprises a three-dimensional display and the graphical object representing the photographing direction is a cone or other suitable shape. In some embodiments, the graphical object representing the photographing direction is a polygon corresponding to a field of view of the camera at the time the photograph was taken.

In some embodiments, the photograph is a composite image of a plurality of photographs, a quantity of the plurality of photographs is based on the speed of the vehicle, and the graphical object representing the photographing direction is shaped based on the field of view of the camera, the speed of the vehicle, and the quantity of the plurality of photographs such that the graphical object representing the photographing direction is a composite outer border of the field of view of the camera of the composite image of the plurality of photographs.

In some embodiments, the photograph comprises two or more candidate objects of interest, and the graphical user interface comprises one or more of static object icons corresponding to each of the two or more candidate objects, selectable object icons that in response to a user input cause the description information corresponding to each of the two or more candidate objects to be displayed, or highlighted candidate object names corresponding to each of the two or more candidate objects in the photographing direction.

According to various embodiments, the graphical user interface helps a viewer of the photograph to review and/or recognize the candidate object of interest in the photograph by providing the graphical object representing the photographing direction and the description information associated with the candidate object of interest. For example, the inclusion of the graphical object representing the photographing direction in graphical user interface with the geographical map might help to jog the viewer's memory about why the photograph was taken and/or to see if other objects are in the photograph and/or nearby the photographing direction or field of view of the camera that the occupant of the vehicle might have intended to be the object of interest in the photograph but missed or that was not identified as a candidate object of interest.

One of ordinary skill in the art would recognize that modifications to the method 100 are within the scope of this description. In some embodiments, the method 100 includes at least one additional operation. In some embodiments, an order of operations of the method 100 is adjusted.

FIG. 2 is a perspective view of a vehicle 200, in accordance with some embodiments. The vehicle 200 is capable of implementing the method 100 (FIG. 1). In some embodiments, the vehicle 200 is capable of implementing the method 100 (FIG. 1) using a system 600 (FIG. 6) mounted in the vehicle. In some embodiments, the vehicle 200 is able to implement the method 100 (FIG. 1) based on receiving instructions from the system 600 (FIG. 6) remote or separable from the vehicle 200. In some embodiments where the system 600 (FIG. 6) is remote or separable from the vehicle 200, the vehicle 200 is configured to receive instructions for implementing the method 100 (FIG. 1) either wirelessly or via a wired connection.

The vehicle 200 includes one or more vehicle systems for implementing operations of the vehicle. In some embodiments, the one or more vehicle systems include one or more of an infotainment system or a navigation system having one or more displays 201, one or more internal or external sensors 203, one or more internal or external cameras 205, and at least one camera 207 having a field of view outside the vehicle for taking a photograph. In some embodiments, the vehicle 200 includes the one or more vehicle systems in only the front portion of the vehicle cabin. In some embodiments, the vehicle 200 includes the one or more vehicle systems in both the front portion of the vehicle cabin and the rear portion of the vehicle cabin.

Figure 3:
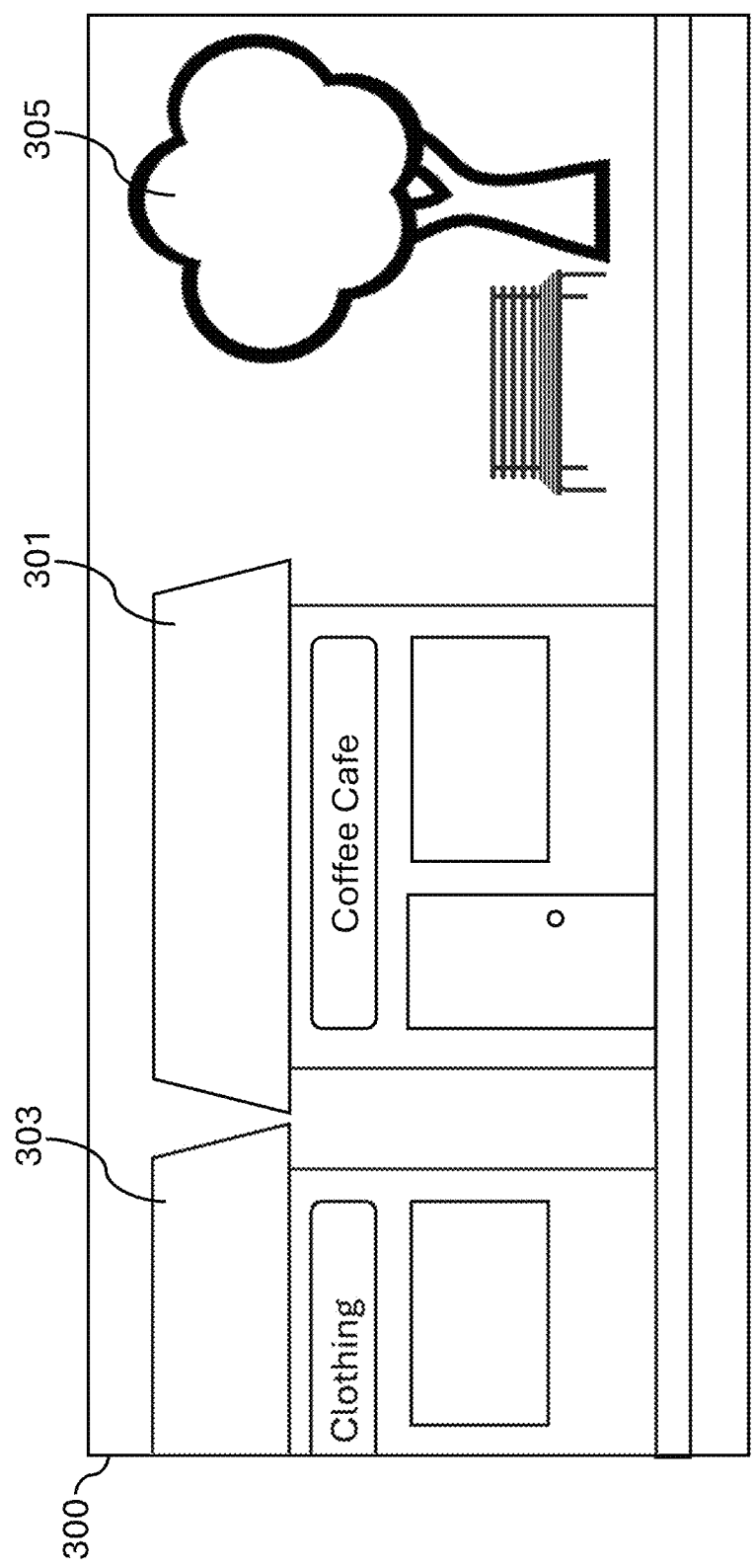
FIG. 3 is an image of a photograph, in accordance with one or more embodiments.

FIG. 3 is an image of a photograph 300, in accordance with one or more embodiments.

Photograph 300 is an example of a photograph taken by a camera of vehicle 200 (FIG. 2) in accordance with method 100 (FIG. 1). Photograph 300, in this example, was taken by an occupant of the vehicle while driving down a street that had several buildings including a café 301, a clothing store 303 and a park 305.

In response to detecting a pointing motion made by the occupant of the vehicle, the photograph 300 was taken and includes the café 301, the clothing store 303, and the park 305.

The system 600 (FIG. 6) processes one or more of the photograph 300, a time the photograph 300 was taken, location information of the vehicle at the time the photograph 300 was taken, a photographing direction extending from the camera at the time the photograph 300 was taken, or map data to obtain a candidate object of interest in the photograph 300 and description information associated with the candidate object of interest.

For example, when the photograph 300 was taken, all of the café 301, the clothing store 303, and the park 305 are in the photograph 300. Later, when reviewing the photograph 300, the occupant of the vehicle may not recall why the photograph 300 was taken or may want to learn information about what an object of interest is in the photograph 300. The system 600 processes the information and data in the photograph 300 and associated with the photograph to identify a candidate object of interest in the photograph 300 and provide description information about the candidate object of interest.

For example, if, based on the pointing direction of the pointing motion and/or gaze direction of the occupant of the vehicle, the system 600 determines the café 301 is the likely object of interest, then the system 600 obtains description information about the café 301 which, in this example, is called "Coffee Café". The system 600 then causes a graphical user interface to be output by a display such as display 201 (FIG. 2) that includes one or more of a geographical map, a location icon indicating a location on the geographical map at which the photograph was taken, a graphical object representing the photographing direction, or description information associated with the candidate object of interest. In some embodiments, the geographical map, the location icon indicating the location on the geographical map at which the photograph was taken, the graphical object representing the photographing direction, and the description information associated with the candidate object of interest are concurrently displayed. In some embodiments, one or more of the geographical map, the location icon indicating the location on the geographical map at which the photograph was taken, the graphical object representing the photographing direction, or the description information associated with the candidate object of interest are displayed by way of separate graphical user interface display screens.

In some embodiments, the system 600 obtains a candidate object of interest by inputting photograph 300 and map data into a multimodal AI. In some embodiments, the map data includes information about one or more objects in the photograph 300 such as café 301, clothing store 303, park 305, etc. The multimodal AI then decides which object in the photograph 300 is a candidate object of interest based on, for example, a position of the objects in the photograph 300. In some embodiments, the multimodal AI is configured to identify which object among a plurality of objects in the photograph is a candidate object of interest in response to determining which object is centered or closest to center in an image. For example, in photograph 300, Coffee Café 301 is closest to center in the photograph. So, in this example wherein the multimodal AI is configured to determine the object at the center of the photograph, the multimodal AI identifies Coffee Café 301 as the candidate object of interest. In some embodiments, in response to determining a photograph has only a single object that is a likely object of interest, the multimodal AI determines the single object that is a likely object of interest in the image is a candidate object of interest regardless of the position of the single object within the photograph. For example, if photograph 300 only had clothing store 303 with an open space where café 301 and park 305 are shown in FIG. 3, then the multimodal AI determines the clothing store 303 is a candidate object of interest.

In some embodiments, context data including audio data received by a microphone associated with the vehicle 200 is processed to identify the candidate object of interest in the photograph 300. For example, if within a preset period of time before, during or after making the pointing motion, the occupant of the vehicle says something like "what's that coffee shop?", "I would like to get some coffee at that place", or "Why don't we get some coffee there and then go to the park next door," the system 600 processes the audio information to assist in identifying that the café 301 and/or the park 305 are candidate object(s) of interest in the photograph 300 and recognize that the clothing store 303 is likely not a candidate object of interest.

FIG. 4 is a graphical user interface 400, in accordance with one or more embodiments.

Graphical user interface 400 includes a geographical map 401, a location icon 403 indicating a location on the geographical map at which a photograph such as photograph 300 (FIG. 3) was taken, a graphical object 405 representing the photographing direction, and description information associated with the candidate object of interest. In this example, the candidate object of interest is the "Coffee Café" 407. Also in the photographing direction are the clothing store 409 and the park 411. The graphical object 405 extends from the location icon 403 in the graphical user interface 400. In this example, the description information for the "Coffee Café" 407 is underlined. In some embodiments, the description information for the candidate object of interest is highlighted, bold, rendered in a different color, is represented by a thumbnail image that is of the photograph 300, a thumbnail image that is of a processed and cropped version of the photograph 300 that focuses on the candidate object of interest, that is of an available commercial picture of the candidate object of interest, or that is based on some other suitable source. In some embodiments, the candidate object of interest icon which, in this example, is the "Coffee Café" 407, is a selectable icon that, when selected by way of a user input, causes the photograph 300 to be displayed, causes description information about the candidate object of interest to be displayed, or some other suitable action. In some embodiments, the description information and the photograph 300 are displayed concurrently with graphical user interface 400. In some embodiments, the description information and the photograph 300 are displayed on a different graphical user interface separated from graphical user interface 400.

In some embodiments, if more than one candidate object of interest is identified in the photograph, then the graphical user interface 400 optionally includes description information for each of the candidate object of interests that is highlighted, bold, rendered in a different color, is represented by a thumbnail image that is of the photograph 300, a thumbnail image that is of a processed and cropped version of the photograph 300 that focuses on the candidate object of interest, that is of an available commercial picture of the candidate object of interest, or that is based on some other suitable source, and/or that is optionally a selectable icon that, when selected by way of a user input, causes the photograph 300 to be displayed, causes description information about the selected candidate object of interest to be displayed, or some other suitable action.

FIG. 5 is a graphical user interface 500, in accordance with one or more embodiments.

Graphical user interface 500 comprises a cropped image of the candidate object of interest which, in this example, is the "Coffee Café" 501 and description information 503 associated with the candidate object of interest. In this example, the description information 501 comprises the name and address of the candidate object of interest and the date and time the photograph of the candidate object of interest was taken. In some embodiments, the cropped image is generated by cutting away portions of a source photograph such as photograph 300 (FIG. 3) that are determined by system 600 are ancillary to the candidate object of interest. In some embodiments, graphical user interface 500 comprises the original photograph 300. In some embodiments, graphical user interface 500 is displayed based on a user input received by way of graphical user interface 400 (FIG. 4). In some embodiments, graphical user interface 500 is displayed concurrently with graphical user interface 400.

FIG. 6 is a block view of a system 600 for acquiring photographs from a vehicle and identifying objects of interest in the photographs in accordance with one or more embodiments. System 600 includes a hardware processor 602 and a non-transitory, computer readable storage medium 604 encoded with, i.e., storing, the computer program code 606, i.e., a set of executable instructions. Computer readable storage medium 604 is also encoded with instructions 607 for interfacing with manufacturing machines for producing the memory array. The processor 602 is electrically coupled to the computer readable storage medium 604 via a bus 608. The processor 602 is also electrically coupled to an input/output (I/O) interface 610 by bus 608. A network interface 612 is also electrically connected to the processor 602 via bus 608. Network interface 612 is connected to a network 614, so that processor 602 and computer readable storage medium 604 are capable of connecting to external elements via network 614. The processor 602 is configured to execute the computer program code 606 encoded in the computer readable storage medium 604 in order to cause system 600 to be usable for performing a portion or all of the operations as described in method 100 (FIG. 1) or implemented by the vehicle 200 (FIG. 2).

In some embodiments, the processor 602 is a central processing unit (CPU), a multi-processor, a distributed processing system, an application specific integrated circuit (ASIC), and/or a suitable processing unit.

In some embodiments, the computer readable storage medium 604 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the storage medium 604 stores the computer program code 604 configured to cause system 600 to perform a portion or all of the operations as described in method 100 (FIG. 1) or implemented by the vehicle 200 (FIG. 2). In some embodiments, the storage medium 604 also stores information used for performing a portion or all of the operations as described in method 100 (FIG. 1) or implemented by the vehicle 200 (FIG. 2) as well as information generated during performing a portion or all of the operations as described in method 100 (FIG. 1) or implemented by the vehicle 200 (FIG. 2), such as an input data parameter 616, a user profile parameter 618, a notification data parameter 620, a vehicle status parameter 622, and/or a set of executable instructions to perform the operation of a portion or all of the operations as described in method 100 (FIG. 1) or implemented by the vehicle 200 (FIG. 2).

In some embodiments, the storage medium 604 stores instructions 607 for interfacing with external devices, e.g., mobile devices. The instructions 607 enable processor 602 to generate or receive instructions readable by the external devices during implementation of a portion or all of the operations as described in method 100 (FIG. 1) or implemented by the vehicle 200 (FIG. 2).

System 600 includes I/O interface 610. I/O interface 610 is coupled to external circuitry. In some embodiments, I/O interface 610 includes a keyboard, keypad, mouse, trackball, trackpad, touch screen and/or cursor direction keys for communicating information and commands to processor 602.

System 600 also includes network interface 612 coupled to the processor 602. Network interface 612 allows system 600 to communicate with network 614, to which one or more other computer systems are connected. Network interface 612 includes wireless network interfaces such as WiFi, Bluetooth®, WiMAX, GPRS, or WCDMA; wired network interface such as a LAN, Ethernet, WAN, USB, IEEE-1394, or other suitable network interface. In some embodiments, a portion or all of the operations as described in method 100 (FIG. 1) or implemented by the vehicle 200 (FIG. 2) is implemented in two or more systems 600, and information such as sensor data, window transmission rate, forecast information or vehicle status are exchanged between different systems 600 via network 614.

Supplemental Note 1

An aspect of this description relates to a method. The method comprises, in response to detecting a pointing motion made by an occupant of a vehicle, causing a photograph to be taken by a camera associated with the vehicle. The method also comprises processing one or more of the photograph, a time the photograph was taken, location information of the vehicle at the time the photograph was taken, a photographing direction extending from the camera at the time the photograph was taken, or map data to obtain a candidate object of interest in the photograph and description information associated with the candidate object of interest. The method further comprises causing a graphical user interface to be output by a display. The graphical user interface comprises a geographical map, a location icon indicating a location on the geographical map at which the photograph was taken, a graphical object representing the photographing direction, and description information associated with the candidate object of interest. The graphical object extends from the location icon in the graphical user interface.

Supplemental Note 2

The method according to Supplemental Note 1, wherein the processing of the one or more of the photograph, the time the photograph was taken, the location information of the vehicle at the time the photograph was taken, the photographing direction extending from the camera at the time the photograph was taken, or the map data to obtain the candidate object of interest in the photograph and the description information associated with the candidate object of interest, comprises: inputting the one or more of the photograph, the time the photograph was taken, the location information of the vehicle at the time the photograph was taken, the photographing direction extending from the camera at the time the photograph was taken, or the map data into a multimodal artificial intelligence (AI) system to generate the description information associated with the candidate object of interest; and processing the description information associated with the candidate object of interest generated by the multimodal AI.

Supplemental Note 3

The method according to Supplemental Note 1 or Supplemental Note 2, wherein the photographing direction is based on one or more of a detected pointing direction of the pointing motion of the occupant of the vehicle, a speed of the vehicle, or a change in the pointing direction of the pointing motion of the occupant of the vehicle with respect to a side of the vehicle as the vehicle moves past the candidate object of interest.

Supplemental Note 4

The method according to any of Supplemental Note 1-3, wherein the graphical object representing the photographing direction is a polygon.

Supplemental Note 5

The method according to any of Supplemental Note 1-3, wherein the graphical object representing the photographing direction is a triangle.

Supplemental Note 6

The method according to any of Supplemental Note 1-3, wherein the graphical object representing the photographing direction is a polygon corresponding to a field of view of the camera at the time the photograph was taken.

Supplemental Note 7

The method according to any of Supplemental Note 1-3, wherein the photograph is a composite image of a plurality of photographs, a quantity of the plurality of photographs is based on the speed of the vehicle, and the graphical object representing the photographing direction is shaped based on the field of view of the camera, the speed of the vehicle, and the quantity of the plurality of photographs such that the graphical object representing the photographing direction is a composite outer border of the field of view of the camera of the composite image of the plurality of photographs.

Supplemental Note 8

The method according to any of Supplemental Note 1-7, wherein a name of the candidate object of interest is highlighted in the graphical user interface.

Supplemental Note 9

The method according to any of Supplemental Note 1-8, further comprising processing context data including audio data received by a microphone within a preset time period encompassing the time the photograph was taken to obtain the candidate object of interest.

Supplemental Note 10

The method according to any of Supplemental Note 1-9, wherein the photograph comprises two or more candidate objects of interest, and the graphical user interface comprises one or more of static object icons corresponding to each of the two or more candidate objects, selectable object icons that in response to a user input cause the description information corresponding to each of the two or more candidate objects to be displayed, or highlighted candidate object names corresponding to each of the two or more candidate objects in the photographing direction.

Supplemental Note 11

An aspect of this description relates to an apparatus. The apparatus includes a processor and a memory having instructions stored thereon that, when executed by the processor, cause the apparatus to, in response to detecting a pointing motion made by an occupant of a vehicle, cause a photograph to be taken by a camera associated with the vehicle. The apparatus is also caused to process one or more of the photograph, a time the photograph was taken, location information of the vehicle at the time the photograph was taken, a photographing direction extending from the camera at the time the photograph was taken, or map data to obtain a candidate object of interest in the photograph and description information associated with the candidate object of interest. The apparatus is further caused to cause a graphical user interface to be output by a display. The graphical user interface comprises a geographical map, a location icon indicating a location on the geographical map at which the photograph was taken, a graphical object representing the photographing direction, and description information associated with the candidate object of interest. The graphical object extends from the location icon in the graphical user interface.

Supplemental Note 12

The apparatus according to Supplemental Note 11, wherein to process the one or more of the photograph, the time the photograph was taken, the location information of the vehicle at the time the photograph was taken, the photographing direction extending from the camera at the time the photograph was taken, or the map data to obtain the candidate object of interest in the photograph and the description information associated with the candidate object of interest, the apparatus is caused to input the one or more of the photograph, the time the photograph was taken, the location information of the vehicle at the time the photograph was taken, the photographing direction extending from the camera at the time the photograph was taken, or the map data into a multimodal artificial intelligence (AI) system to generate the description information associated with the candidate object of interest; and process the description information associated with the candidate object of interest generated by the multimodal AI.

Supplemental Note 13

The apparatus according to Supplemental Note 11 or Supplemental Note 12, wherein the photographing direction is based on one or more of a detected pointing direction of the pointing motion of the occupant of the vehicle, a speed of the vehicle, or a change in the pointing direction of the pointing motion of the occupant of the vehicle with respect to a side of the vehicle as the vehicle moves past the candidate object of interest.

Supplemental Note 14

The apparatus according to any of Supplemental Note 11-13, wherein the graphical object representing the photographing direction is a polygon.

Supplemental Note 15

The apparatus according to any of Supplemental Note 11-13, wherein the graphical object representing the photographing direction is a triangle.

Supplemental Note 16

The apparatus according to any of Supplemental Note 11-13, wherein the graphical object representing the photographing direction is a polygon corresponding to a field of view of the camera at the time the photograph was taken.

Supplemental Note 17

The apparatus according to any of Supplemental Note 11-13, wherein the photograph is a composite image of a plurality of photographs, a quantity of the plurality of photographs is based on the speed of the vehicle, and the graphical object representing the photographing direction is shaped based on the field of view of the camera, the speed of the vehicle, and the quantity of the plurality of photographs such that the graphical object representing the photographing direction is a composite outer border of the field of view of the camera of the composite image of the plurality of photographs.

Supplemental Note 18

The apparatus according to any of Supplemental Note 11-17, wherein a name of the candidate object of interest is highlighted in the graphical user interface.

Supplemental Note 19

The apparatus according to any of Supplemental Note 11-18, wherein the apparatus is further caused to process context data including audio data received by a microphone within a preset time period encompassing the time the photograph was taken to obtain the candidate object of interest.

Supplemental Note 20

The apparatus according to any of Supplemental Note 11-19, wherein the photograph comprises two or more candidate objects of interest, and the graphical user interface comprises one or more of static object icons corresponding to each of the two or more candidate objects, selectable object icons that in response to a user input cause the description information corresponding to each of the two or more candidate objects to be displayed, or highlighted candidate object names corresponding to each of the two or more candidate objects in the photographing direction.

Supplemental Note 21

An aspect of this description relates to a non-transitory computer readable medium having instructions stored thereon that, when executed by the processor, cause an apparatus to, in response to detecting a pointing motion made by an occupant of a vehicle, cause a photograph to be taken by a camera associated with the vehicle. The apparatus is also caused to process one or more of the photograph, a time the photograph was taken, location information of the vehicle at the time the photograph was taken, a photographing direction extending from the camera at the time the photograph was taken, or map data to obtain a candidate object of interest in the photograph and description information associated with the candidate object of interest. The apparatus is further caused to cause a graphical user interface to be output by a display. The graphical user interface comprises a geographical map, a location icon indicating a location on the geographical map at which the photograph was taken, a graphical object representing the photographing direction, and description information associated with the candidate object of interest. The graphical object extends from the location icon in the graphical user interface.

Supplemental Note 22

The non-transitory computer readable medium according to Supplemental Note 11, wherein to process the one or more of the photograph, the time the photograph was taken, the location information of the vehicle at the time the photograph was taken, the photographing direction extending from the camera at the time the photograph was taken, or the map data to obtain the candidate object of interest in the photograph and the description information associated with the candidate object of interest, the apparatus is caused to input the one or more of the photograph, the time the photograph was taken, the location information of the vehicle at the time the photograph was taken, the photographing direction extending from the camera at the time the photograph was taken, or the map data into a multimodal artificial intelligence (AI) system to generate the description information associated with the candidate object of interest; and process the description information associated with the candidate object of interest generated by the multimodal AI.

Supplemental Note 23

The non-transitory computer readable medium according to Supplemental Note 21 or Supplemental Note 22, wherein the photographing direction is based on one or more of a detected pointing direction of the pointing motion of the occupant of the vehicle, a speed of the vehicle, or a change in the pointing direction of the pointing motion of the occupant of the vehicle with respect to a side of the vehicle as the vehicle moves past the candidate object of interest.

Supplemental Note 24

The non-transitory computer readable medium according to any of Supplemental Note 21-23, wherein the graphical object representing the photographing direction is a polygon.

Supplemental Note 25

The non-transitory computer readable medium according to any of Supplemental Note 21-23, wherein the graphical object representing the photographing direction is a triangle.

Supplemental Note 26

The non-transitory computer readable medium according to any of Supplemental Note 21-23, wherein the graphical object representing the photographing direction is a polygon corresponding to a field of view of the camera at the time the photograph was taken.

Supplemental Note 27

The non-transitory computer readable medium according to any of Supplemental Note 21-23, wherein the photograph is a composite image of a plurality of photographs, a quantity of the plurality of photographs is based on the speed of the vehicle, and the graphical object representing the photographing direction is shaped based on the field of view of the camera, the speed of the vehicle, and the quantity of the plurality of photographs such that the graphical object representing the photographing direction is a composite outer border of the field of view of the camera of the composite image of the plurality of photographs.

Supplemental Note 28

The non-transitory computer readable medium according to any of Supplemental Note 21-27, wherein a name of the candidate object of interest is highlighted in the graphical user interface.

Supplemental Note 29

The non-transitory computer readable medium according to any of Supplemental Note 21-28, wherein the apparatus is further caused to process context data including audio data received by a microphone within a preset time period encompassing the time the photograph was taken to obtain the candidate object of interest.

Supplemental Note 30

The non-transitory computer readable medium according to any of Supplemental Note 21-29, wherein the photograph comprises two or more candidate objects of interest, and the graphical user interface comprises one or more of static object icons corresponding to each of the two or more candidate objects, selectable object icons that in response to a user input cause the description information corresponding to each of the two or more candidate objects to be displayed, or highlighted candidate object names corresponding to each of the two or more candidate objects in the photographing direction.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   in response to detecting a pointing motion made by an occupant of a vehicle, causing a photograph to be taken by a camera associated with the vehicle;
   processing one or more of the photograph, a time the photograph was taken, location information of the vehicle at the time the photograph was taken, a photographing direction extending from the camera at the time the photograph was taken, or map data to obtain a candidate object of interest in the photograph and description information associated with the candidate object of interest; and
   causing a graphical user interface to be output by a display, the graphical user interface comprising:
   a geographical map;
   a location icon indicating a location on the geographical map at which the photograph was taken;
   a graphical object representing the photographing direction, wherein the graphical object extends from the location icon in the graphical user interface; and
   description information associated with the candidate object of interest.

2. The method of claim 1, wherein the processing of the one or more of the photograph, the time the photograph was taken, the location information of the vehicle at the time the photograph was taken, the photographing direction extending from the camera at the time the photograph was taken, or the map data to obtain the candidate object of interest in the photograph and the description information associated with the candidate object of interest, comprises:
   inputting the one or more of the photograph, the time the photograph was taken, the location information of the vehicle at the time the photograph was taken, the photographing direction extending from the camera at the time the photograph was taken, or the map data into a multimodal artificial intelligence (AI) system to generate the description information associated with the candidate object of interest; and
   processing the description information associated with the candidate object of interest generated by the multimodal AI.

3. The method of claim 1, wherein the photographing direction is based on one or more of a detected pointing direction of the pointing motion of the occupant of the vehicle, a speed of the vehicle, or a change in the pointing direction of the pointing motion of the occupant of the vehicle with respect to a side of the vehicle as the vehicle moves past the candidate object of interest.

4. The method of claim 1, wherein the graphical object representing the photographing direction is a polygon.

5. The method of claim 1, wherein the graphical object representing the photographing direction is a triangle.

6. The method of claim 1, wherein the graphical object representing the photographing direction is a polygon corresponding to a field of view of the camera at the time the photograph was taken.

7. The method of claim 1, wherein the photograph is a composite image of a plurality of photographs, a quantity of the plurality of photographs is based on a speed of the vehicle, and the graphical object representing the photographing direction is shaped based on a field of view of the camera, the speed of the vehicle, and the quantity of the plurality of photographs such that the graphical object representing the photographing direction is a composite outer border of the field of view of the camera of the composite image of the plurality of photographs.

8. The method of claim 1, wherein a name of the candidate object of interest is highlighted in the graphical user interface.

9. The method of claim 1, further comprising:
   processing context data including audio data received by a microphone within a preset time period encompassing the time the photograph was taken to obtain the candidate object of interest.

10. The method of claim 1, wherein
the photograph comprises two or more candidate objects of interest, and
the graphical user interface comprises one or more of static object icons corresponding to each of the two or more candidate objects, selectable object icons that in response to a user input cause the description information corresponding to each of the two or more candidate objects to be displayed, or highlighted candidate object names corresponding to each of the two or more candidate objects in the photographing direction.

11. An apparatus, comprising:
a processor; and
a memory having instructions stored thereon that, when executed by the processor, cause the apparatus to:
in response to detecting a pointing motion made by an occupant of a vehicle, cause a photograph to be taken by a camera associated with the vehicle;
process one or more of the photograph, a time the photograph was taken, location information of the vehicle at the time the photograph was taken, a photographing direction extending from the camera at the time the photograph was taken, or map data to obtain a candidate object of interest in the photograph and description information associated with the candidate object of interest; and
cause a graphical user interface to be output by a display, the graphical user interface comprising:
a geographical map;
a location icon indicating a location on the geographical map at which the photograph was taken;
a graphical object representing the photographing direction, wherein the graphical object extends from the location icon in the graphical user interface; and
description information associated with the candidate object of interest.

12. The apparatus of claim 11, wherein to process the one or more of the photograph, the time the photograph was taken, the location information of the vehicle at the time the photograph was taken, the photographing direction extending from the camera at the time the photograph was taken, or the map data to obtain the candidate object of interest in the photograph and the description information associated with the candidate object of interest, the apparatus is caused to:
input the one or more of the photograph, the time the photograph was taken, the location information of the vehicle at the time the photograph was taken, the photographing direction extending from the camera at the time the photograph was taken, or the map data into a multimodal artificial intelligence (AI) system to generate the description information associated with the candidate object of interest; and
process the description information associated with the candidate object of interest generated by the multimodal AI.

13. The apparatus of claim 11, wherein the photographing direction is based on one or more of a detected pointing direction of the pointing motion of the occupant of the vehicle, a speed of the vehicle, or a change in the pointing direction of the pointing motion of the occupant of the vehicle with respect to a side of the vehicle as the vehicle moves past the candidate object of interest.

14. The apparatus of claim 11, wherein the graphical object representing the photographing direction is a polygon.

15. The apparatus of claim 11, wherein the graphical object representing the photographing direction is a triangle.

16. The apparatus of claim 11, wherein the graphical object representing the photographing direction is a polygon corresponding to a field of view of the camera at the time the photograph was taken.

17. The apparatus of claim 11, wherein the photograph is a composite image of a plurality of photographs, a quantity of the plurality of photographs is based on a speed of the vehicle, and the graphical object representing the photographing direction is shaped based on a field of view of the camera, the speed of the vehicle, and the quantity of the plurality of photographs such that the graphical object representing the photographing direction is a composite outer border of the field of view of the camera of the composite image of the plurality of photographs.

18. The apparatus of claim 11, wherein a name of the candidate object of interest is highlighted in the graphical user interface.

19. The apparatus of claim 11, wherein the apparatus is further caused to:
process context data including audio data received by a microphone within a preset time period encompassing the time the photograph was taken to obtain the candidate object of interest.

20. A non-transitory computer readable storage medium having instructions stored thereon that, when executed by a processor, cause an apparatus to:
in response to detecting a pointing motion made by an occupant of a vehicle, cause a photograph to be taken by a camera associated with the vehicle;
process one or more of the photograph, a time the photograph was taken, location information of the vehicle at the time the photograph was taken, a photographing direction extending from the camera at the time the photograph was taken, or map data to obtain a candidate object of interest in the photograph and description information associated with the candidate object of interest; and
cause a graphical user interface to be output by a display, the graphical user interface comprising:
a geographical map;
a location icon indicating a location on the geographical map at which the photograph was taken;
a graphical object representing the photographing direction, wherein the graphical object extends from the location icon in the graphical user interface; and
description information associated with the candidate object of interest.

* * * * *